Dec. 29, 1931.  A. J. BOYNTON ET AL  1,838,737
APPARATUS FOR DRYING WET GASES
Filed Jan. 2, 1929   2 Sheets-Sheet 1
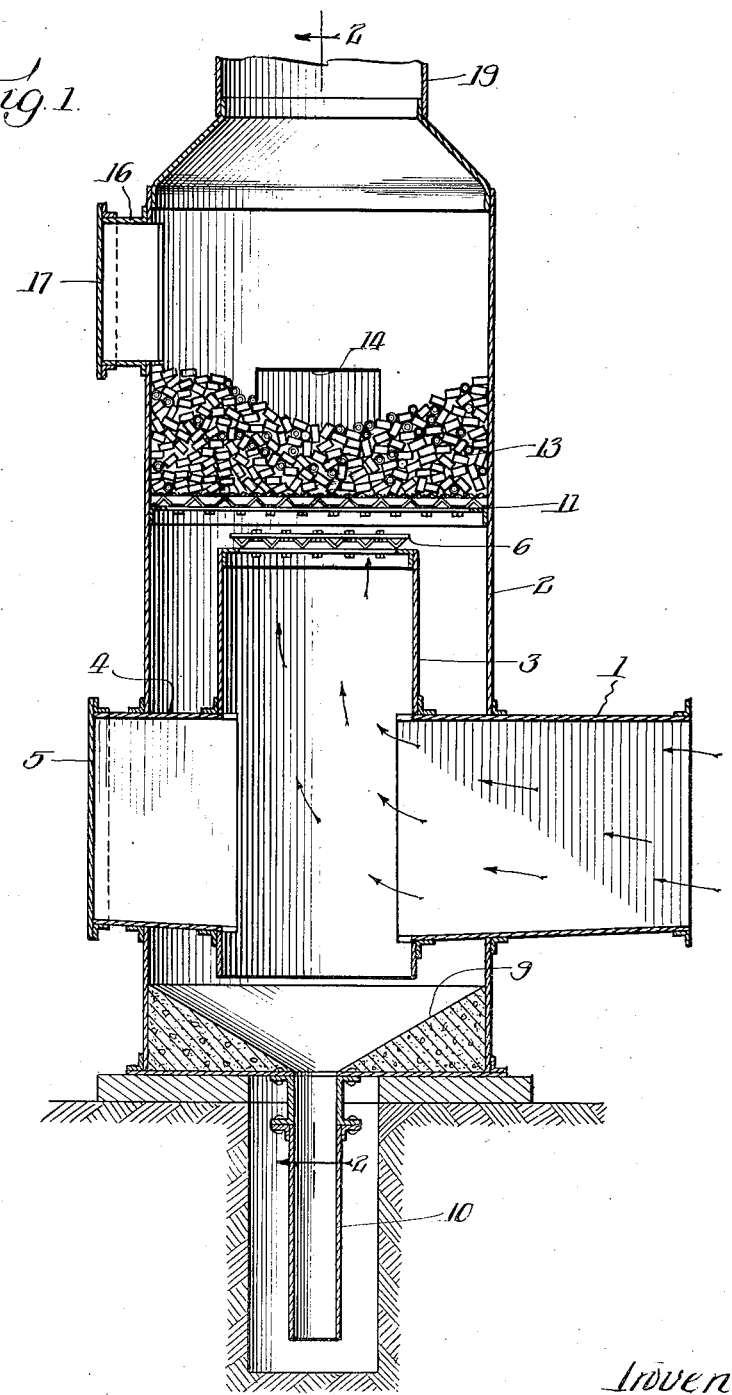

Dec. 29, 1931.   A. J. BOYNTON ET AL   1,838,737
APPARATUS FOR DRYING WET GASES
Filed Jan. 2, 1929   2 Sheets-Sheet 2
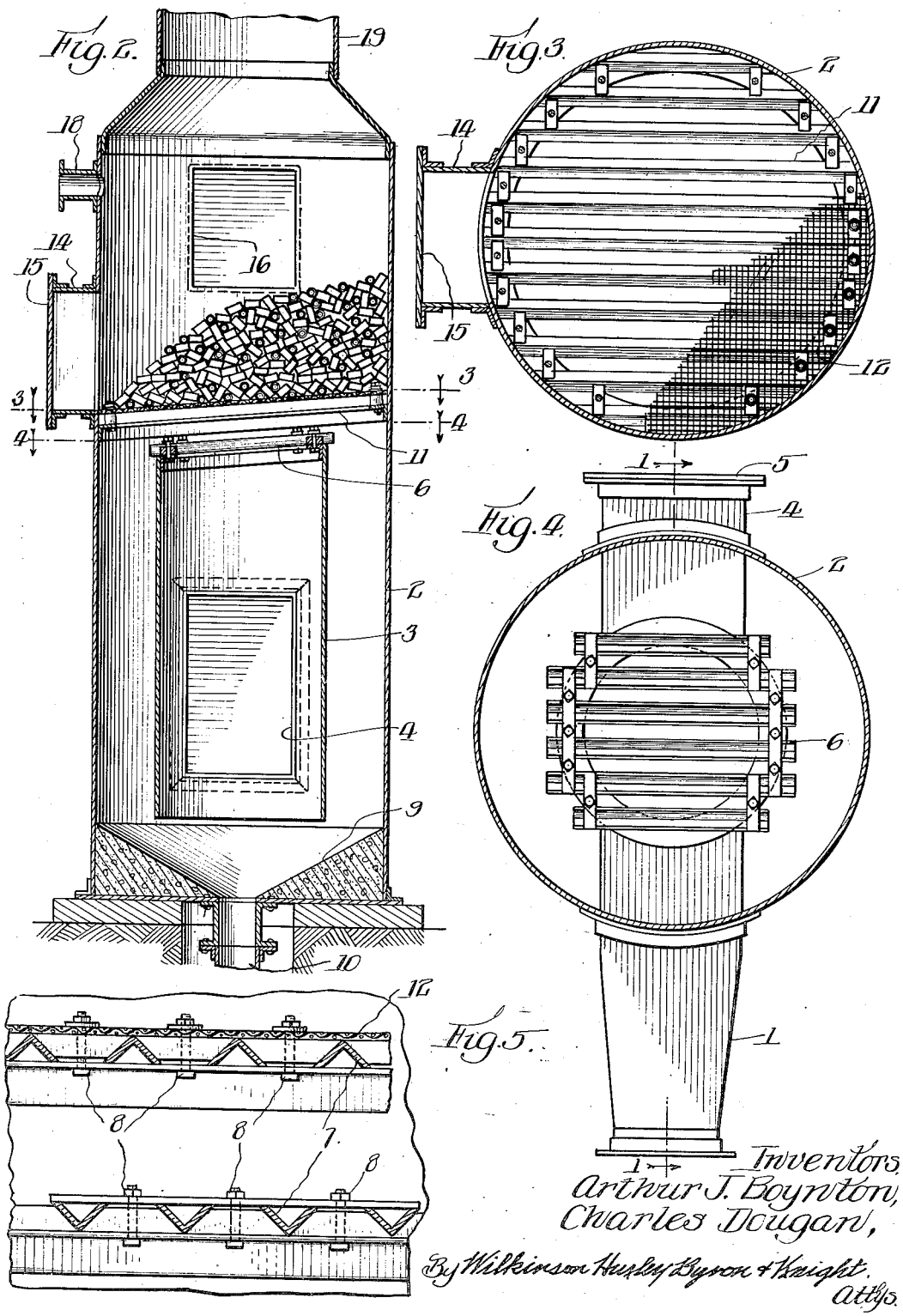
Inventors
Arthur J. Boynton,
Charles Dougan,
By Wilkinson Huxley Byron & Knight
Attys.

Patented Dec. 29, 1931

1,838,737

UNITED STATES PATENT OFFICE

ARTHUR J. BOYNTON AND CHARLES DOUGAN, OF CHICAGO, ILLINOIS, ASSIGNORS TO H. A. BRASSERT & CO., OF CHICAGO, ILLINOIS, A CORPORATION OF ILLINOIS

APPARATUS FOR DRYING WET GASES

Application filed January 2, 1929. Serial No. 329,885.

This invention relates to an improved apparatus for removing entrained moisture from gases and principally to the removal of the finely entrained moisture remaining in blast furnace gas which has been subjected to washing or cleaning in previous spray towers, mechanical washers or other forms of wet gas cleaners.

In the usual method of cleaning blast furnace gas, the gas is passed upward through a washer tower down which a water current passes over suitable baffling means countercurrent to the passage of the gas. The outlet gas from this tower is further cleaned in mechanical washers such as wet fans, disintegrators, or similar apparatus which removes a large portion of the moisture in the gas, however, the gas after its passage through mechanical washers is still intimately mixed with a finely entrained mist of water which renders the gas unsuitable for efficient combustion. The finely entrained water in the gas, if allowed to enter the combustion chambers of hot blast stoves or boilers, causes a considerable loss in heat. Further, the entrained moisture holds some of the dust contained in the original gas and it is therefore very desirable to remove the finely entrained moisture and dust as much as possible before using the gas in combustion chambers. In prior methods and apparatus baffle plates and filters have been used and it has been attempted to eliminate the moisture by deflection or reversal of the direction of movement of the gas or by subjecting it to centrifugal action. The difficulties of the prior apparatus have resided in the fact that the separated water was liable, when caught on the baffles or other deflecting means, to flow back into the stream of gas and be picked up again, and, therefore the outlet gas was not sufficiently dry.

It is the purpose of this invention to provide an efficient gas drier having the inlet chamber, the eliminating chamber and the water collecting chamber so arranged that the gas passing through the apparatus is sufficiently dried.

A further object of our invention is to provide an apparatus in which an inlet chamber is supported within a tower and providing a series of angle bars supported at the upper end of the inlet chamber in a slanting plane so that the water collecting in the troughs formed by the angle bars will flow longitudinally of the bars and drop between the walls of the inlet chamber and the tower. Just above this series of angle bars is a second series of angle bars oppositely disposed and supported across the tower in a slanting plane in such a manner that the gas passing upward through the inlet chamber is deflected and distributed by the two series of baffling angle bars and directed through a deep layer of filter material supported by a screen above the second series of angle bars.

It is further an object of this invention to so design the apparatus that entrance to the filter chamber at the top of the cleaning tower may be easily had in order to remove and replace the loose material filling the filter chamber.

Other objects and advantages of our improved apparatus and method will be more clearly evident as the description proceeds.

In the drawings wherein we have shown one embodiment of an improved apparatus especially adapted for carrying out our method—

Figure 1 is a sectional elevation through the complete tower on line 1—1 of Figure 4.

Figure 2 is a sectional elevation through the complete tower on line 2—2 of Figure 1.

Figure 3 is a cross sectional view on line 3—3 of Figure 2.

Figure 4 is a cross sectional view on line 4—4 of Figure 2.

Figure 5 is a detail sectional view of the two series of deflecting members.

We have shown an inlet pipe 1 for the gas which may come from prior mechanical washers or cleaners. The inlet pipe 1 extends transversely into a tower 2 which encloses the apparatus and directs the gas into an upward direction. The tower 2 may be of the usual cylindrical shape, as shown, or any other desired form. At the lower end of the tower 2 and supported axially thereof is a short cylindrical collecting and directing inlet chamber 3 opened at its upper and lower ends and connected to the inlet pipe 1. Opposite to the inlet pipe 1, we have shown a pipe 4 extending through the tower 2 into the inlet chamber 3 and having a door 5 at its outer end whereby access may be had to the interior of the tower. At the upper end of the inlet chamber 3, as shown in Figures 1, 2 and 4, is secured a set or series 6 of baffling members 7. This first set 6 of baffling members may comprise, as shown in detail in Figure 5, a plurality of individual angle bars 7 bolted together by securing means 8. The angle bars 7 are supported with the troughs facing upward and any form of baffles may be used which form troughs or discharge surfaces which will collect water dropping from above and cause it to flow transversely out of the column of gas rising through the inlet chamber 3. The transverse flow of the collected water may be assisted by supporting the series of bars 6 in a slanting plane, as shown in Figure 2, thus the collected water will flow into the annular water collecting chamber formed between the walls of the inlet chamber 3 and the tower 2. The bottom of the tower 2 is formed into a conical shape 9 in order to direct the collected water into a central discharge pipe 10. The discharge pipe 10 is connected to any common form of water seal preventing passage of gas therethrough. The gas rising through the inlet chamber 3 after being deflected and distributed by the set 6 of baffling members expands somewhat into a larger area and meets a second series 11 of baffling members 7. This second set 11 of baffling members is supported in a similar slanting position parallel to the first set 6 and completely covers the cross sectional area of the tower 2. However, it will be noted from Figure 5 that the individual angle bars 7 composing the second set of baffling members 11 are oppositely disposed with respect to the first set of angle bars 6, that is, the troughs are facing downwards, but it will be noted that the bars extend in the same longitudinal direction and are so spaced and arranged that the spaces between adjacent bars are directly over the troughs of the first set of baffling members 6, thus the collected water passing downward through the tower is caused to flow between the slanting sides of the upper angle bars 7 and drop into the troughs formed by the lower angle bars 7. It will be obvious that many modifications in form of the individual baffles 7 may be made.

Supported on the top of the set of baffling members 11 is a screen 12 which has openings small enough in size to support the loose filter material 13 contained above the screen. The loose filter material 13 which eliminates the water from the gas, may be composed of a deep layer of short pieces of pipe, cork or other material which will offer a large area of surface contact for the gases and provide a sufficient amount of voids so that the free passage of the gas will not be greatly retarded. The layer should be comparatively deep and may be from one to four feet.

A manhole opening 14 extending through the wall of the tower 2 and having a door 15 provides a discharge means for the contained filter material. From Figure 2 it is apparent that the opening 14 is immediately adjacent the lower side of the slanting plane of the screen 12, thus the slanting surface assists in the discharge of the material. An inlet opening 16 having a door 17 is provided for the introduction of the filter material into the filter chamber. The opening 18 provides a connection for flushing the tower and cleaning the loose material. The upper end of the tower has a central opening communicating with an outlet pipe 19.

In the use of our apparatus the gas, which may be blast furnace gas, after being cleaned and washed in prior apparatuses, but still containing finely entrained moisture, is passed into the tower through the inlet pipe 1 and directed upward through the inlet chamber 3. Any moisture or water collecting on the walls of the inlet chamber 3 will run down and be discharged through the lower open end. The gas will pass upward and be deflected and distributed by the first series 6 of baffling means and then pass immediately through the second set 11 of baffling and distributing means and then through the layer of filter material 13. The entrained moisture in the gas will be separated from the gas due to the large area of surface contact presented to the gas by the loose material. The separated water will gradually work down through the filter material and be directed by the first set 11 of baffling means into the troughs of the lower set 6 of baffling members. The water collected in the troughs will immediately flow transversely of the rising column of gas and fall outside the walls of the inlet chamber 3 and then be directed by the conical bottom 9 of the tower 2 into the discharge pipe 10. It will be noted that the set 6 of baffle members for the incoming gas also serve as collecting and discharging means for the water thus performing a dual function. At periodic intervals the filter material 13 may be removed and replaced by clean material. The gas which passes out at the upper end of the tower is substantially clean and free from entrained moisture and may be used for combustion without a great loss in heat.

It will be understood that many modifications and changes may be made in our detailed apparatus and method without departing from the spirit of the invention as expressed in the appended claims.

We claim:
1. A gas drier comprising inlet means for the gas, means for distributing and deflect- ing the gas, means adjacent the last mentioned means for eliminating the water from the gas and means between said inlet means and said distributing means for collecting and discharging the water separated from the gas.

2. A gas drier comprising inlet means for the gas, means for distributing and deflecting the gas, means above and adjacent the last mentioned means for eliminating the water from the gas and means for collecting and discharging the water separated from the gas, said collecting and discharging means also deflecting the gas.

3. A gas drier comprising inlet means for the gas, means for distributing and deflecting the gas, means comprising a layer of loose material adjacent the last mentioned means for eliminating the water from the gas, and means arranged in a slanting position between said inlet means and said distributing means for collecting and discharging the water separated from the gas.

4. In a gas drier comprising a vertical tower, an inlet chamber for the gas supported in vertical position within said tower, a layer of loose material for eliminating the water from the gas supported at the upper end of said tower, means for supporting the loose material comprising a series of spaced V-shaped bars supported with the points of the V's upward, a screen overlying the V-shaped bars, said loose material being supported above said screen, and a second series of V-shaped bars supported in spaced position at the upper end of said inlet chamber arranged with the points of the V's of the V-shaped bars downward.

5. A gas drier comprising a vertical tower, a deep layer of loose material supported at the upper end of said tower for eliminating the water from the gas, a series of V-shaped bars supported in spaced position in a slanting plane beneath the layer of loose material, said V-shaped bars being arranged with the points of the V's upward forming discharge spaces between the slanting sides of the bars, a second series of V-shaped bars supported beneath the first mentioned series, said bars being arranged with their troughs immediately below the upper discharge spaces, said bars being disposed in a slanting plane in order to discharge the water collected in the troughs.

6. A gas drier comprising a vertical tower, an inlet chamber supported within said tower and having its upper and lower ends open, means for admitting the gas to be dried to the inlet chamber, a series of V-shaped bars supported at the upper end of said inlet chamber in a slanting plane forming collecting and discharging troughs for the separated water and forming distributing means for the gas arising through the inlet chamber, a screen supported within said tower about said V-shaped bars, a layer of loose material supported by said screen and outlet means for the dried gas at the upper end of said tower.

7. A gas drier comprising inlet means for the gas, means for distributing and deflecting the gas, means comprising a layer of loose material adjacent the last mentioned means for eliminating the water from the gas and means between said inlet means and said distributing means for collecting and discharging the water separated from the gas.

Signed at Chicago, Illinois, this 28th day of December, 1928.

ARTHUR J. BOYNTON.
CHARLES DOUGAN.